J. C. REIMERS.
LAWN MOWER.
APPLICATION FILED NOV. 6, 1907.
898,925.
Patented Sept. 15, 1908.
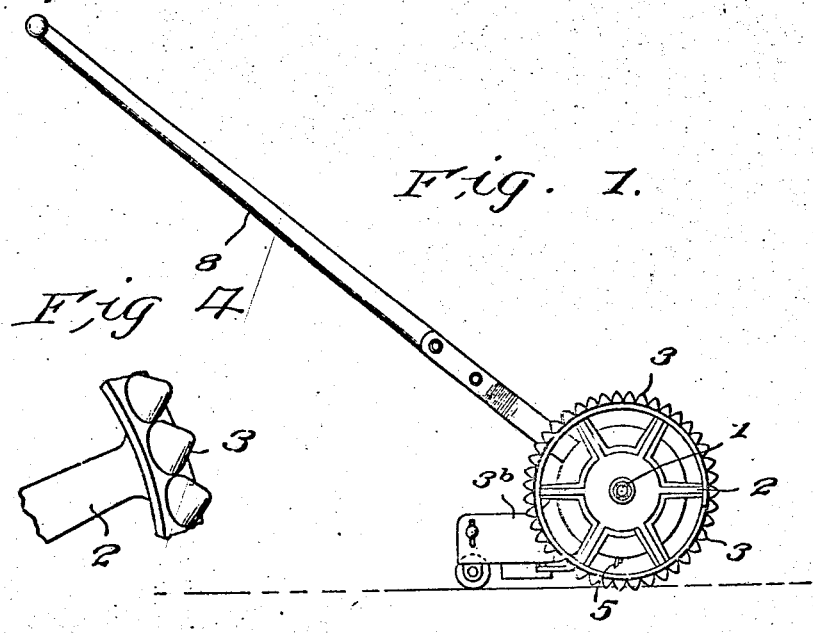
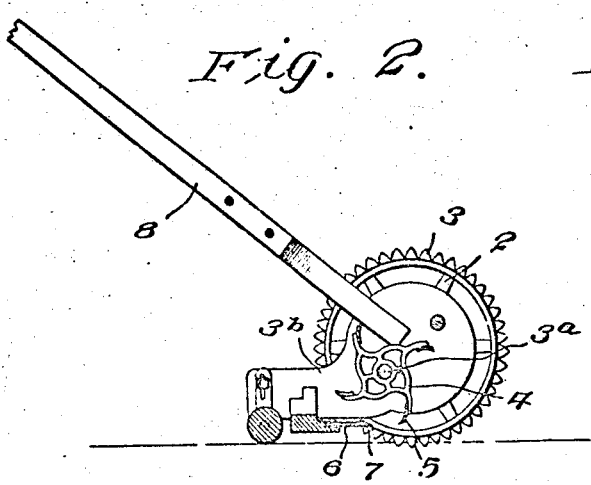
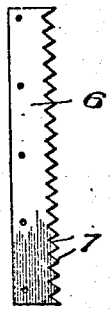
WITNESSES:
INVENTOR
J. C. Reimers
BY
W. J. Fitzgerald
Attorneys

UNITED STATES PATENT OFFICE.

JOHN CLARENCE REIMERS, OF STELLA, NEBRASKA.

LAWN-MOWER.

No. 898,925. Specification of Letters Patent. Patented Sept. 15, 1908.

Application filed November 6, 1907. Serial No. 400,992.

*To all whom it may concern:*

Be it known that I, JOHN C. REIMERS, a citizen of the United States, residing at Stella, in the county of Richardson and State of Nebraska, have invented certain new and useful Improvements in Lawn-Mowers; and I do hereby declare the following to be a full, clear, and exact description of the invention, such as will enable others skilled in the art to which it appertains to make and use the same.

My invention relates to new and useful improvements in lawn mowers of that class having rotary blades or reels and my object is to provide a wearing plate for the blades and arrange the forward edge thereof in such manner as to keep the grass from slipping when engaged by the blades, said blades being arranged to give a shearing motion when rotated and a further object is to provide means for preventing the driving wheels of the mower from slipping.

Other objects and advantages will be hereinafter referred to and more particularly pointed out in the claim.

In the accompanying drawings which are made a part of this application, Figure 1 is a side elevation of my improved mower complete. Fig. 2 is a sectional view, and, Fig. 3 is a plan view of the wearing plate removed from the mower. Fig. 4 is a detailed perspective view showing a segment of one of the driving wheels and the teeth or cogs thereof.

Referring to the drawings in which similar reference numerals designate corresponding parts throughout the several views, 1 indicates stub shafts, on which are rotatably mounted driving wheels 2, the treads of said wheels being provided with cone-shaped prongs 3, which are adapted to engage the soil as the mower is moved thereover and prevent the wheels from slipping.

Rotatably mounted on a shaft $3^a$, between frames $3^b$, to which the stub shafts 1 are secured, is a reel 4, to which is secured a plurality of cutting blades 5, the forward edges of which are beveled and adapted to engage a wearing plate 6 and sever the grass as the mower travels thereover, said plate being located at a point adjacent the earth's surface and in the path of said blades. This wearing plate 6 is secured to a cross plate $6^a$ secured at its ends to the side frames $3^b$ and said cross plate $6^a$ is so formed as to position the wearing plate 6 beneath the lower edges of the side frames 3.

The forward edge of the plate 6 is tapered so that a sharp edge will be presented to the cutting edges of the blades 5 and in order to separate the grass into tufts and hold the same from moving laterally from in front of the cutting blades, the tapered edge of the plate 6 is provided with a plurality of V-shaped notches 7, which have their tops beveled in the same plane and into which the grass enters as the mower is moved forwardly and by forming the forward edge of the plate in this manner and arranging the blades in the manner shown, they will have a shearing movement in passing over the plate.

The blades are driven by providing the usual form of gearing (not shown) between the wheels 2 and the shaft $3^a$, on which the reel 4 is fixed and as the mower is driven forwardly by means of the usual form of handle 8, it will be readily seen that the blades will be rapidly rotated and the cutting edges thereof moved into engagement with the wearing plate 6. It will be further seen that by providing the V-shaped notches at the forward edge of the plate 6, the grass will be positively severed and prevented from moving laterally when engaged by the cutting blades and it will also be seen that by tapering the forward edge of the plate 6, said plate may be readily adjusted towards the cutting blades as the plate and blades become worn, thereby presenting a sharp edge to the cutting blades until the plate is worn out. It will likewise be seen that by forming the prongs on the driving wheels 2, said wheels will be prevented from slipping when wet grass is encountered.

What I claim is:

In combination with a mower including rotatable cutting blades; a fixed plate carried by the mower beneath the cutting blade arranged in a horizontal plane the forward edge of said plate being provided with a series of teeth having their tops beveled in the same plane.

In testimony whereof I have signed my name to this specification in the presence of two subscribing witnesses.

JOHN CLARENCE REIMERS.

Witnesses:
I. W. HARRIS,
J. F. JENKINS.